United States Patent Office 3,567,777
Patented Mar. 2, 1971

3,567,777
4-CHLORO-5-SULFAMYL SALICYLIC ACID-(2',6'-DIMETHYL) ANILIDE
Walter Liebenow, Hamburg, Germany, assignor to P. Beiersdorf & Co. Aktiengesellschaft, Hamburg, Germany
No Drawing. Filed June 13, 1966, Ser. No. 556,860
Claims priority, application Germany, June 19, 1965,
B 82,474
Int. Cl. C07c *143/78*
U.S. Cl. 260—556         1 Claim

ABSTRACT OF THE DISCLOSURE 4-chloro-5-sulphamyl salicylic acid derivatives of the general formula:

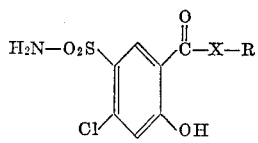

in which X represents an oxygen atom or an NH— group and R represents an alkyl group having 1 to 3 carbon atoms, an unsubstituted phenyl residue, or a phenyl residue mono- or di-substituted by halogen atoms, trifluoromethyl-, hydroxyl-, nitro-, alkyl or alkoxy groups; and ammonium and alkali metal salts of the derivatives. A process for production of the compounds and pharmaceutical compositions containing them are also disclosed.

---

This invention relates to salicylic acid derivatives, their production and pharmaceutical compositions containing them.

Accordng to a first feature of the present invention, there are provided 4-chloro-5-sulphamyl salicylic acid derivatives of the general Formula I

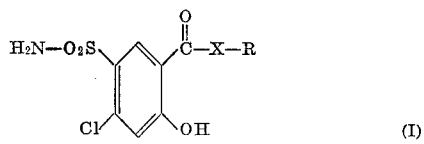
(I)

in which X represents an oxygen atom or an NH— group and R represents an alkyl group having 1 to 3 carbon atoms, an unsubstituted phenyl residue, or a phenyl residue mono- or di-substituted by halogen atoms, trifluoromethyl-, hydroxyl-, nitro-, alkyl or alkoxy groups, and ammonium, and alkali metal salts thereof. Alkyl or alkoxy substituents present in the phenyl residue preferably contain 1 to 3 carbon atoms.

According to a further feature of the invention there is provided a process for the production of 4-chloro-5-sulphamyl salicylic acid derivatives as defined in Formula I which comprises reacting 4-chloro-5-sulphamyl salicylic acid or 4-chloro-5-sulphamyl salicylic acid chloride of Formula II

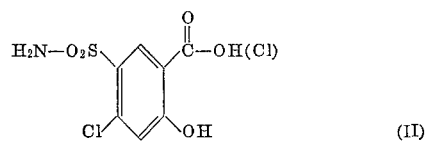
(II)

with a compound of the general Formula III

R—Z wherein R has the meaning assigned to it above and Z represents an amino or hydroxyl group.

Suitable compounds of the general Formula III for the reaction with 4-chloro-5-sulphamyl salicylic acid or its chloride accordingly include not only aliphatic and aromatic primary amines but also aliphatic alcohols and phenols or phenol derivatives.

The substance 4-chloro-5-sulphamyl salicylic acid of Formula II is advantageously obtained by chlorosulphonation of 4-chloro salicylic acid and then reaction of the 4-chloro-5-chlorosulphonyl salicylic acid so formed with ammonia. The desired end product is precipitated by acidification of the ammonical solution and can be purified by recrystallisation from water. 4-chloro-5-sulphamyl salicylic acid chloride can be prepared in known manner by reaction of 4-chloro-5-sulphamyl salicylic acid with thionyl chloride.

The reaction conditions for the production of 4-chloro-5-sulphamyl salicylic acid derivatives of general Formula I are variable according to the kind of reactant used for the reaction with 4-chloro-5-sulphamyl salicylic acid or 4-chloro-5-sulphamyl salicylic acid chloride.

Thus, for example, for the production of compounds of the general Formula I wherein X represents an NH— group and R is a phenyl group either unsubstituted or mono- or di-substituted with the specified substituents, 4-chloro-5-sulphamyl salicylic acid is heated for several hours in a polar organic solvent such as chlorobenzene with an aromatic amine in the presence of a condensing agent, the heating being preferably at the reflux temperature of the organic solvent. Phosphorus halides, in particular phosphorus trichloride, prove especially suitable as condensing agents for this reaction, which proceeds as follows:

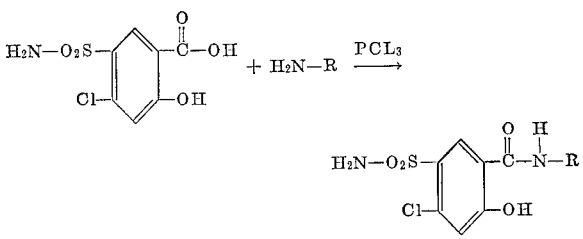

Among the compounds mono-substituted in the phenyl residue in this range of compounds, substitution in the o-position is preferred to substitution in the p- or m-position. The production of compounds of general Formula I in which X represents an NH— group and R an alkyl group of 1 to 3 carbon atoms, may be achieved by reaction of 4-chloro-5-sulphamyl salicyclic acid chloride either with an excess of primary aliphatic amine without the use of an organic solvent medium or with an equimolecular quantity of the aliphatic amine in an organic solvent medium, such as dioxane, and preferably in the presence of triethylamine at low temperatures.

In the preparation of compounds of general Formula I in which X represents an oxygen atom and R has any of the meanings given, either the 4-chloro-5-sulphamyl salicylic acid is converted to a phenol ester by treatment with a phenol derivative in the presence of a phosphorus halide such as phosphorus oxychloride by many hours heating at high temperatures, or the 4-chloro-5-sulphamyl salicylic acid is refluxed in an excess of alcohol in the presence of H⁺ ions for many hours and the corresponding ester is obtained in this way after working up. Thus:

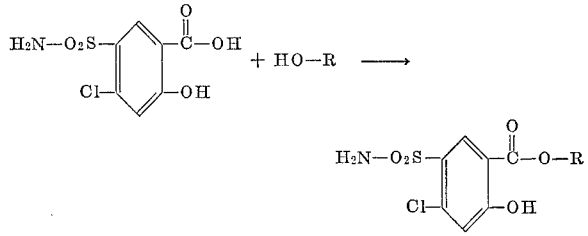

The working up of the reaction product may be effected conventionally and presents no particular difficulty.

The 4-chloro-5-sulphamyl salicylic acid derivatives of the invention may be converted to the corresponding ammonium or alkali metal salts by dissolving the compound in an aqueous or alcoholic solution of ammonia or alkali metal hydroxide and then evaporating the solvent medium under vacuum.

The products prepared according to the invention have valuable therapeutic properties especially as diuretics and saluretics. In animal experiments they have proved to be clearly superior with regard to their diuretic and saluretic properties to the known available oral, mercury-free 6-chloro - 7 - sulphamyl - 1   2,4 - benzothiadiazin - 1,1 - dioxide (chlorothiazide).

The following examples will serve to illustrate the invention:

EXAMPLE 1

4-chloro-5-sulphamyl salicylic acid-(2'-methyl)-anilide

A mixture of 5.0 g. 4-chloro-5-sulphamyl salicylic acid, 2.14 g. o-toluidine and 100 ml. of water-free chlorobenzene were stirred at room temperature with 0.9 ml. phosphorus trichloride. Then the mixture was heated under reflux for 5½ hours. After cooling, the chlorobenzene was decanted from the precipitate which was collected on a filter and washed, first with chlorobenzene and, after drying, with 2 N hydrochloric acid and water. The 4-chloro-5-sulphamyl salicylic acid-(2'-methyl)-anilide so obtained was finally recrystallised from methanol and was in the form of colourless needles with a melting point of 186° C.

The 4-chloro-5-sulphamyl salicylic acid used as starting point was prepared in the following way:

(a) 4-chloro-5-chlorosulphonyl salicylic acid 100 g. 4-chloro salicylic acid and added portionwise with stirring at about −5° C. to 275 ml. chlorosulphonic acid. The temperature should not be allowed to rise above +3° C. At the end of the addition, the solution formed was stirred for 1 hour in an ice bath, then for 1 hour at 20° C. and finally for 2½ hours at 80° C. oil bath temperature. Then the dark brown solution, after ensuing slow cooling with vigorous stirring, was poured onto ice; the precipitate was vacuum filtered, washed with water and dried. After recrystallisation from toluene the compound formed had a melting point of 181 to 183° C.

(b) 4-chloro-5-sulphamyl salicylic acid 40 g. 4-chloro-5-chlorosulphonyl salicylic acid obtained from (a) was added portionwise with stirring to 250 ml. liquid ammonia. This was allowed to stand for 2 hours, then the precipitate was vacuum filtered and dissolved in 500 ml. water. The solution was filtered and the filtrate was treated with 2 N hydrochloric acid until no more precipitation occurred. The 4-chloro-5-sulphamyl salicylic acid obtained as the precipitate was filtered off and finally recrystallised from water. Melting point: 258 to 260° C.

Required (percent): C, 33.41; H, 2.40; Cl, 14.09; N, 5.57; S, 12.74. Found (percent): C, 32.21; H, 2.53; Cl, 13.80; N, 5.88; S, 12.64.

EXAMPLE 2

4-chloro-5-sulphamyl salicylic acid-(2'-chloro)-anilide 5.0 g. 4-chloro-5-sulphamyl salicylic acid were suspended in 100 ml. water-free chlorobenzene and then 2.55 g. o-chloroaniline and 0.9 ml. phosphorus trichloride were added to the suspension in turn. The reaction mixture was heated under reflux for 5 hours. After cooling, the chlorobenzene was separated from the precipitate by decantation. The latter was finally collected on a filter and washed, first with chlorobenzene and, after drying, with 2 N hydrochloric acid and water. The compound obtained by recrystallisation from methanol had a melting point of 226° C.

The following new 4-chloro-5-sulphamyl salicylic acid derivatives can be prepared according to Example 1 or 2:

4-chloro-5-sulphamyl salicylic acid anilide (recrystallised from methanol) M.P. 229° C.

4-chloro-5-sulphamyl salicylic acid-(2'-bromo) anilide (recrystallised from methanol) M.P. 237° C.

4-chloro-5-sulphamyl salicylic acid-(2'-fluoro) anilide (recrystallised from methanol) M.P. 228° C.

4 - chloro - 5-sulphamyl salicylic acid-(2'-trifluoromethyl) anilide (recrystallised from methanol/water) M.P. 225° C.

4-chloro-5-sulphamyl salicylic acid-(2'-nitro) anilide (recrystallised from chlorobenzene) M.P. 240° C.

4-chloro-5-sulphamyl salicylic acid-(2'-ethyl) anilide (recrystallised from methanol) M.P. 119° C.

4-chloro-5-sulphamyl salicylic acid-(2'-isopropyl) anilide (recrystallised from 50% ethanol) M.P. 191° C.

4-chloro-5-sulphamyl salicylic acid-(2'-ethoxy) anilide (recrystallised from methanol) M.P. 230° C.

4-chloro-5-sulphamyl salicylic acid-(2',3'-dichloro) anilide (recrystallised from methanol) M.P. 266° C.

4-chloro-5-sulphamyl salicylic acid-(2',4'-dichloro) anilide (recrystallised from acetic acid and finally from water) M.P. 250° C.

4-chloro-5-sulphamyl salicylic acid-(2',6'-dichloro) anilide (recrystallised from chlorobenzene) M.P. 216° C.

4-chloro-5-sulphamyl salicylic acid-(2'-chloro-6'-methyl) anilide (recrystallised from methanol) M.P. 227° C.

4-chloro-5-sulphamyl salicylic acid-(2',6'-dimethyl) anilide (recrystallised from methanol/water) M.P. 256° C.

EXAMPLE 3

4-chloro-5-sulphamyl salicylic acid methyl amide 10.3 g. 4-chloro-5-sulphamyl salicylic acid chloride was added to 100 ml. methylamine over a period of 45 min. with intensive cooling in a mixture of ice and table salt. The clear, light-brown coloured solution obtained was allowed to stand for 15 hours at room temperature. After this time, the oil left behind was dissolved in water, filtered through a cellular filter and the clear filtrate was treated with 2 N hydrochloric acid until a distinctly acid reaction was observed. The precipitate formed was suction filtered, washed and recrystallised from methanol. Melting point: 252° C.

In a similar way, 4-chloro-5-sulphamyl salicylic acid propylamide can be prepared by the corresponding reaction of 4-chloro-5-sulphamyl salicylic acid chloride with propylamine. Melting point: 241° C. (after recrystallisation from ethanol).

EXAMPLE 4

4-chloro-5-sulphamyl salicylic acid ethyl amide 1.35 g. ethylamine was dissolved in 10 ml. water-free dioxane. This solution was added dropwise at a temperature of 10° C. with stirring to a solution of 2.7 g. 4-chloro-5-sulphamyl salicylic acid chloride in 20 ml. dry dioxane. The reaction mixture was stirred at 8° C. for 1 hour and then at room temperature for 2 hours. After longer standing the dioxane was removed by decantation and the remaining oil was treated with 2 N hydrochloric acid until an acid reaction was observed. The crystalline precipitate formed was recrystallised from toluene. Melting point: 215° C.

EXAMPLE 5

4-chloro-5-sulphamyl salicylic acid ethyl amide 5.4 g. 4-chloro-5-sulphamyl salicylic acid chloride were dissolved in 40 ml. dioxane. The solution was added dropwise to a solution of 0.9 g. ethylamine and 4.2 ml. triethylamine in 20 ml. dioxane at about 10° C. bath temperature. After longer standing, the reaction mixture was worked up further as described in Example 4. Melting points of reaction product obtained: 215° C. (recrystallised from toluene).

In a similar way, 4-chloro-5-sulphamyl salicylic acid isopropyl amide can be obtained by the corresponding reaction of 4-chloro-5-sulphamyl salicylic acid chloride with isopropylamine in place of ethylamine. Melting point: 133° C. (after recrystallisation from chlorobenzene).

EXAMPLE 6

4-chloro-5-sulphamyl salicylic acid-(2'-chlorophenyl) ester 10 g. 4-chloro-5-sulphamyl salicylic acid were stirred up with 5.1 g. o-chlorophenol and 10 ml. phosphorus oxychloride and the resulting mixture was heated for 4 hours in an oil bath at 80–90° C. An opaque, viscous mass is gradually formed thereby, which is produced after longer standing with stirring in a sodium carbonate solution, whereby a crystalline product precipitates. After recrystallisation from methanol the compound formed melts at 172° C.

Required (percent): C, 43.11; H, 2.51; Cl, 19.58. Found (percent): C, 42.99; H, 2.69; Cl, 19.69.

EXAMPLE 7

4-chloro-5-sulphamyl salicylic acid methyl ester 25.1 g. 4-chloro-5-sulphamyl salicylic acid was added to a mixture of 10 ml. conc. sulphuric acid and 150 ml. methanol and the resulting solution was then heated under reflux for 5 hours. On cooling the solution, part of the reaction product was precipitated, the other part being obtained by concentration of the filtrate obtained by separation of the precipitate. The precipitate was collected and then washed. After recrystallisation, from methanol, the compound obtained melted at 188° C.

EXAMPLE 8

4-chloro-5-sulphamyl salicylic acid ethyl ester 5.0 g. 4-chloro-5-sulphamyl salicylic acid were dissolved in 100 ml. ethanol and heated to boiling point. Then dry hydrogen chloride was passed into the solution at the boiling temperature over a period of 4 hours. Then the solution was reduced in vacuum to half volume, mixed with 50 ml. water and neutralised with sodium bicarbonate. Then the mixture obtained was extracted three times with about 100 ml. ether, the collected ether extracts were dried over sodium sulphate, the ether was evaporated off and the residue was recrystallised from benzene. Melting point of 4-chloro-5-sulphamyl salicylic acid ethyl ester so obtained: 199° C.

Required (percent): C, 38.65; H, 3.60; Cl, 12.68; S, 11.46. Found (percent): C, 38.87; H, 3.63; Cl, 12.59; S, 11.33.

The invention further includes pharmaceutical compositions which comprise a compound of general Formula I or an ammonium or alkali metal salt thereof together with a pharmaceutically acceptable diluent. The diluent may be liquid, e.g. water, or may be a powdered solid, e.g. talc, magnesium stearate and like well known diluent constituents of phramaceutical tabletted products, the composition thus being in powder or tablet form.

I claim as my invention:

1. The compound 4-chloro-5-sulphamyl salicylic acid-(2',6'-dimethyl)anilide of the formula:

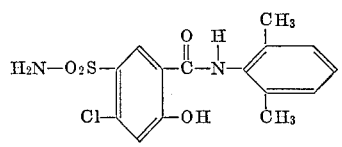

and the ammonium and alkali metal salts thereof.

References Cited

UNITED STATES PATENTS

| | | | |
|---|---|---|---|
| 3,384,635 | 5/1968 | Carabateas | 260—470 |
| 3,203,987 | 8/1965 | Hoefle | 260—556 |
| 3,112,337 | 11/1963 | De Wald et al. | 260—470 |
| 3,111,540 | 11/1963 | Meyer | 260—556 |
| 2,910,488 | 10/1959 | Novello | 260—470 |

FOREIGN PATENTS

| | | | |
|---|---|---|---|
| 882,090 | | Great Britain | 260—556C |
| 912,060 | 12/1962 | Great Britain | 260—556 |

OTHER REFERENCES

Beasley et al.: J. Pharm. & Pharmacol, vol. 10, pp. 696–7 (1958).

LORRAINE A. WEINBERGER, Primary Examiner

E. J. GLEIMAN, Assistant Examiner

U.S. Cl. X.R.

260—470, 519, 544; 424—309, 321